UNITED STATES PATENT OFFICE.

ALFRED PARAF, OF BOSTON, MASSACHUSETTS.

IMPROVED PROCESS OF SEPARATING COLORING MATTER FROM MADDER AND OTHER PLANTS.

Specification forming part of Letters Patent No. 74,935, dated February 25, 1868.

*To all whom it may concern:*

Be it known that I, ALFRED PARAF, a resident of Boston, in the State of Massachusetts, have invented a new and useful Process of Liberating the Coloring Matter of Madder and Similar Vegetable Substances from the ligneous matter or cellulose with which it is combined in the plant; and I do hereby declare that the following is a full, clear, and exact description of my said invention.

Dry madder-root, for example, contains about seven per cent. of coloring matter, combined with about thirty-eight per cent. of ligneous matter and about fifty-five per cent of sugary matter. In the ordinary process of dyeing and printing madder-colors only about half the coloring matter is utilized, and this portion is obtained by tedious processes requiring a large amount of manual labor.

The object of the invention which constitutes the subject-matter of this patent is to liberate the coloring matter of the madder-root or similar plant from the ligneous matter, so that, practically, the whole amount of coloring matter of the root may be utilized. The invention is based upon the fact that cellulose becomes soluble when in the presence of cupric oxide with ammonia; and the first part of the invention consists of a compound process composed of two operations, which are, first, the solution of the cellulose of the plant by the action of cupric oxide with ammonia; second, the separation of the copper from the coloring matter that has been set free from the cellulose by the preceding operation.

The invention consists, further, of the combination of the said two operations with the separation of the sugary matter of the plant from it.

In order that the invention may be fully understood, I will proceed to describe the several modes in which I have applied the principle of my invention when operating upon madder-root.

The madder-root, previously dried and reduced to powder by grinding or other means, is washed with water by several successive operations until the sugary matters are separated and removed, which may be ascertained by testing the wash-water for sugar with Bareswell's liquor in the usual manner. The damp, washed madder-root, drained from the water, is next subjected to the action of cupric oxide with ammonia by steeping the damp root, in an open vessel, in aqueous ammonia in which copper-turnings have been placed. This operation may be conveniently performed in an earthenware vessel fitted with a perforated cover, which permits the access of air. In performing the operation, it is expedient to use one pound of metallic copper and seven gallons of aqueous ammonia for each pound of ligneous matter to be removed. Thus, assuming that the madder-root contains thirty-eight per cent. of ligneous matter, thirty-eight pounds of copper-turnings and about two hundred and sixty gallons of aqueous ammonia may be used for each one hundred pounds of dry ground madder-root. In the presence of the copper, the aqueous ammonia, and the air, (which has access through the cover of the vessel,) the ligneous matter of the plant is gradually dissolved, while the coloring matter and copper form insoluble compounds, which remain in the liquid in the form of a precipitate. The operation requires, generally, several days, during which the materials should be occasionally stirred. The ammonia in the liquid also must be renewed, which is conveniently effected by passing a current of gaseous ammonia into the liquid in the vessel. The gaseous ammonia for this purpose may be produced in any of the modes known to chemists, and the quantity introduced daily should be sufficient to cause the solution of about twenty per cent. of the ligneous matter, so that the operation may be completed in about five days. If any of the copper remains undissolved at the end of the period, and the liquid still contains free ammonia, an additional quantity of washed madder-root may be added, little by little, until all the copper is dissolved. On the other hand, if all the copper is dissolved, and some of the madder-root remains undecomposed, metallic copper may be added, little by little, until the madder-root is substantially all decomposed.

The coloring matter being thus set free from the ligneous matter or cellulose by the solution of the latter, the next operation is the separation of the coloring matter and copper. This operation may be performed in several ways, as follows:

First. The dissolved cellulose is removed from the compounds of the coloring matter and copper by filtration and by washing the precipitate. Then the precipitate is mixed with alcohol, and a current of sulphureted hydrogen (HS) is passed into the mixture. This subtance decomposes the compounds of the coloring matter and copper, setting free the coloring matter and transforming the copper into an insoluble cupric sulphide. The coloring matter dissolves in the alcohol as fast as it is set free, while the cupric sulphide remains in the liquid in the form of a black precipitate, which is readily separated by filtration. The filtered alcoholic solution of the coloring matter may be concentrated by boiling until the coloring matters will crystallize; or the coloring matters may be precipitated by adding acetic acid to the alcoholic solution until precipitation ceases, after which they may be separated from the liquid by filtration.

Second. The separation of the coloring matter and copper may be effected by the use of a small quantity of alcohol in the following manner: The compounds of coloring matter and copper, after the removal of the dissolved cellulose by filtration and washing, are mixed with water, and a current of sulphureted hydrogen is passed through the mixture until precipitation ceases. The precipitate is separated from the liquid by filtration, and is dried, after which the coloring matter is extracted by treating the precipitate successively with small quantities of boiling alcohol. The coloring matter may be obtained from the alcoholic solution as in the previous mode.

Third. The separation of the coloring matter and copper may be effected without the use of alcohol in the following manner: The compounds of coloring matter and copper, separated from the dissolved cellulose by filtration, are mixed (without previous washing) with a dilute solution of hydrochloric acid (HCl) sufficient to transform the copper into the protochloride of copper, and the excess of ammonia into chloride of ammonium. The liquid is boiled for about ten minutes, or until the copper is dissolved in the form of the chloride, while the coloring matter remains in the form of a reddish precipitate, which is separated from the liquid by filtration and washing.

Fourth. If the coloring matter is to be used at once for dyeing, the dissolved cellulose need not be removed from the compounds of coloring matter and copper; but a sufficient amount of hydrochloric acid (HCl) may be added to the liquid to combine with the excess of ammonia, to transform the copper into the soluble protochloride of copper and to precipitate the cellulose. The coloring matter, being insoluble in water and acid, remains in the liquid in the form of a precipitate. The precipitated cellulose and coloring matter are then freed of the chlorides of copper and ammonium by filtration and washing, and the product remaining in the filter may be used in the same manner as practiced in dyeing with madder-root; but, as the coloring matter in this product is liberated from the cellulose, and is only mechanically mixed with it in the same manner as it might be with any inactive adulterating material, the dyer is able to utilize, practically, the whole of the coloring matter of the plant, instead of only about half of it, as in the ordinary method of using madder.

The filtered solution of cellulose obtained in any of the preceding modes may have hydrochloric acid added to it until the excess of ammonia is neutralized, the copper remaining in the liquid is dissolved in the condition of a chloride, and the cellulose is precipitated. The liquid may then be removed by filtration and washing, and the product utilized for any purpose that is expedient, one of such purposes being the manufacture of paper. When using the product for this purpose, I treat it with sulphuric acid in the manner practiced for transforming paper-pulp into artificial parchment.

The material obtained by the above-described operations, designated, respectively, "first," "second," and "third," may be used advantageously for either dyeing or printing, the material, when used for printing, being previously mixed with the acetate of alumina or of iron, or a mixture of the two, to produce red, purple, or chocolate colors, and being also mixed with gum or starch in the usual mode of thickening. After printing, the cloths should be steamed in the usual mode, and washed with water, with or without soap. The material obtained by the operation designated "fourth" is useful specially for dyeing.

Having thus described several modes of practicing the invention when applied to the liberation of the coloring matter of madder, I declare that I do not limit the invention to its application to that particular vegetable material, but intend to apply it to the liberation of such other vegetable coloring matters as it may be found applicable to.

What I claim as the invention, and desire to secure by Letters Patent, is—

1. The compound process of liberating the coloring matter of plants from the ligneous matter by the solution of the cellulose and the separation of the coloring matter from the insoluble compounds formed during the said solution, substantially as before set forth.

2. The compound process of liberating the coloring matter of plants from the sugary and ligneous matters thereof by the removal of the sugary matter, the solution of the cellulose, and the separation of the coloring matter, substantially as before set forth.

In testimony whereof I have hereto set my hand this 4th day of January, A. D. 1868.

ALFRED PARAF.

Witnesses:
E. S. RENWICK,
W. L. BENNEM.